(12) United States Patent
Parker et al.

(10) Patent No.: US 7,818,986 B1
(45) Date of Patent: Oct. 26, 2010

(54) MULTIPLE AUTOFRETTAGE

(75) Inventors: Anthony P. Parker, Ringmer (GB); Edward Troiano, Schenectady, NY (US); John H. Underwood, Salem, NY (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 373 days.

(21) Appl. No.: 12/124,457

(22) Filed: May 21, 2008

Related U.S. Application Data

(60) Provisional application No. 60/939,671, filed on May 23, 2007.

(51) Int. Cl.
*B21D 26/02* (2006.01)
*B23P 11/02* (2006.01)
*B21D 39/20* (2006.01)
*B21D 22/10* (2006.01)

(52) U.S. Cl. .................. 72/58; 72/56; 72/60; 72/61; 29/446; 29/447; 29/421.1

(58) Field of Classification Search .............. 72/56, 72/58, 60, 61; 29/1.11, 446, 447, 421.1
See application file for complete search history.

(56) References Cited

U.S. PATENT DOCUMENTS

| | | | | |
|---|---|---|---|---|
| 3,751,954 A * | 8/1973 | Ezra et al. | ............. | 72/56 |
| 4,571,969 A * | 2/1986 | Tomita | ............. | 72/56 |
| 5,177,990 A * | 1/1993 | Isgen | ............. | 72/54 |
| 6,154,946 A * | 12/2000 | Kapp | ............. | 29/447 |
| 6,418,770 B1 * | 7/2002 | Binno | ............. | 72/58 |
| 6,931,776 B2 * | 8/2005 | Wagner et al. | ............. | 42/76.1 |
| 7,036,346 B2 * | 5/2006 | Burger | ............. | 72/54 |

* cited by examiner

*Primary Examiner*—David B Jones
(74) *Attorney, Agent, or Firm*—John F. Moran

(57) ABSTRACT

A manufacturing method includes a first step of performing swage autofrettage on an object; a second step of heat soaking the object; and a third step of performing hydraulic autofrettage on the object. The second and third steps may be repeated one or more times. A final step may be heat soaking the object. The object may be, for example, a pressure vessel or gun barrel.

16 Claims, 7 Drawing Sheets

MULTIPLE AUTOFRETTAGE

CROSS-REFERENCE TO RELATED APPLICATIONS

This application claims the benefit under 35 USC 119(e) of U.S. provisional patent application No. 60/939,671 filed on May 23, 2007, which application is hereby incorporated by reference.

STATEMENT OF GOVERNMENT INTEREST

The inventions described herein may be manufactured, used and licensed by or for the U.S. Government for U.S. Government purposes.

BACKGROUND OF THE INVENTION

The invention relates in general to manufacturing methods and in particular to manufacturing methods for enhancing residual stresses. The following non-patent literature is referred to in the specification and is expressly incorporated by reference herein:

[1] Bauschinger, J., 1881, "Ueber die Veranderung der Elasticitatagrenze and dea Elasticitatamoduls verschiadener Metalle", Zivilingenieur, Vol 27, columns 289-348.

[2] Parker, A. P., Troiano, E., Underwood, J. H. and Mossey, C., 2003, "Characterization of Steels Using a Revised Kinematic Hardening Model Incorporating Bauschinger Effect", ASME Journal of Pressure Vessel Technology, Vol 125, pp. 277-281.

[3] Lemaitre, J. and Chaboche, J.-L., 1990, Mechanics of Solid Materials, Cambridge University Press.

[4] Parker, A. P., 2001, "Autofrettage of Open-End Tubes—Pressures, Stresses, Strains and Code Comparisons", ASME J Pressure Vessel Technology, Vol 123, pp. 271-281.

[5] O'Hara, G. P., 1992, "Analysis of the Swage Autofrettage Process", US Army ARDEC Technical Report ARCCB-TR-92016, Benét Laboratories, Watervliet Arsenal, N.Y. 12189, USA.

[6] Parker, A. P., O'Hara, G. P. and Underwood, J. H., 2003, "Hydraulic versus Swage Autofrettage and Implications of the Bauschinger Effect", ASME Journal of Pressure Vessel Technology, Vol 125, pp. 309-314.

[7] Underwood, J. H., deSwardt, R. R, Venter, A. M., Troiano, E., Parker, A. P., "Hill Stress Calculations for Autofrettaged Tubes Compared With Neutron Diffraction Residual Stresses and Measured Yield Pressure and Fatigue Life", Paper PVP2007-26617, Proceedings of PVP2007, 2007 ASME Pressure Vessels and Piping Division Conference, Jul. 22-26, 2007, San Antonio, Tex.

[8] Iremonger, M. J. and Kalsi, S. K., "A Numerical Study of Swage Autofrettage", 2003, ASME Journal of Pressure Vessel Technology, Vol 125, pp. 347-351.

[9] Parker, A. P., 2004, "A Re-Autofrettage Procedure for Mitigation of Bauschinger Effect in Thick Cylinders", ASME Journal of Pressure Vessel Technology, 126, pp. 451-454.

[10] Parker, A. P. and Kendall, D. P., 2003, "Residual Stresses and Lifetimes of Tubes Subjected to Shrink Fit Prior to Autofrettage", ASME Journal of Pressure Vessel Technology, Vol 125, pp. 282-286.

[11] Paris, P. C. and Erdogan, F., 1963, "A Critical Analysis of Crack Propagation Laws", Journal of Basic Engineering, Trans ASME, Vol 85, pp. 528-534.

[12] Underwood, J. H., Moak, D. B., Audino, M. A. and Parker, A. P., 2003, "Yield Pressure Measurements and Analysis for Autofrettaged Cannons," Journal of Pressure Vessel Technology, 125, pp. 7-10.

[13] Troiano, E., Underwood, J. H., deSwardt, R. R., Venter, A., Parker, A. P. and Mossey, C, 2007, "3D Finite Element Modeling Of the Swage Autofrettage Process Including the Bauschinger Effect", ASME PVP2007-ICPVT12 Conference, Paper PVP2007-ICPVT12-26743, July 22-26, San Antonio, Tex., USA.

Prior to normal use, many engineering components and structures are subjected to overloads in excess of their design operating level. Examples of such overloads are "shakedown" of a bridge structure; hydraulic or swage autofrettage of a pressure vessel (including gun barrels); and mandrel enlargement of rivet holes (including aircraft structures).

In general, the purpose of such overloads is to cause the stresses within the material(s) to behave in an inelastic fashion at design-critical locations and thereby, on removal of initial overload, to induce advantageous residual stresses at or near the critical locations. These residual stresses subsequently serve to mitigate the stresses due to normal operation and thereby improve fatigue lifetime and/or improve fracture resistance and/or inhibit re-yielding. For example, in the case of a typical pressure vessel, the use of autofrettage can increase the fatigue lifetime of a tube with pre-existing crack-like defects by approximately one order of magnitude.

Many materials exhibit the Bauschinger effect [1], [2]. The Bauschinger effect serves to reduce the yield strength in compression as a result of prior tensile plastic overload (or vice-versa, when compression precedes tension). It is often assumed that the Bauschinger effect is associated with the pile-up of microscopic dislocations at grain boundaries and the associated creation of microscopic zones of residual stress [3]. The reduction of yield strength after load reversal is of importance because, on removal of the overload, critical regions experience high values of reversed stress. This may approach the magnitude of the yield strength if the unloading is totally elastic. If, because of the Bauschinger effect, the combination of stresses exceeds some yield criterion, the component or structure will re-yield, thus losing much of the potential benefit of overloading.

The loss of residual compressive hoop stress has been quantified for the case of hydraulically autofrettaged open-end tubes [4]. Such tubes are overloaded during an autofrettage process involving extremely high bore pressures applied to the length of the tube; this is usually termed "hydraulic autofrettage". The ratio of the wall thickness which behaves plastically during autofrettage to the total wall thickness is termed the "overstrain". As a rule of thumb, for typical diameter ratios and overstrain levels, "ideal" residual compressive hoop stress at the bore is reduced by 30% by Bauschinger effect and associated effects. As a result, the fatigue lifetime of a typical tubular steel pressure vessel subjected to 80% overstrain which does not exhibit Bauschinger effect may be more than one order of magnitude greater than the same pressure vessel which does exhibit Bauschinger effect. Hence, if it were possible to eliminate the deleterious impact of the Bauschinger effect, the lifetime of the component would be very significantly increased.

SUMMARY OF THE INVENTION

It is an object of the invention to provide a method for enhancing the residual stresses in a structure.

It is another object of the invention to provide a method of improving one or more of the fatigue lifetime, fracture resistance, and re-yield resistance of a structure.

One aspect of the invention is a method comprising a first step of performing swage autofrettage on an object; a second step of heat soaking the object; and a third step of performing hydraulic autofrettage on the object. The method may further comprise repeating the second and third steps. The method may additionally comprise a fourth step of heat soaking the object.

In one embodiment, the method may comprise adding material to the object and/or removing material from the object after the first, third or fourth step. In some embodiments, the heat soaking step or steps may be restricted to a critical area of the object.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

An alternative to hydraulic autofrettage is "swage autofrettage" in which a relatively short mandrel is forced along the inside of the tube. This produces localized yielding near the mandrel. A residual stress solution for the case of swage autofrettage assuming ideal elastic-perfectly plastic behavior without Bauschinger effect, is reported by O'Hara [5]. The results presented in [5] were later adjusted to incorporate Bauschinger effect [6]. Subsequently, work by Underwood et al [7] quantified experimentally some residual stress fields due to swage autofrettage.

In some overload procedures, such as autofrettage, it has been common practice, following overload, to "heat soak" all or part of the structure by way of a slowly applied heating and cooling process in order to stabilize the material. It is often assumed that heat soak produces a "healing" effect at the microscopic level such that dislocation pile-ups caused by the overload are very significantly dissipated or removed.

There has been examination of a "double overload" procedure wherein the structure is overloaded once and then, without any intervening process, is subjected to a second similar overload. Apart from a modest contribution due to further strain hardening and/or "ratcheting" of the material, such a process produces little or no benefit [8].

A procedure proposed in [9] involves the following sequence:
1. Initial hydraulic autofrettage;
2. One or more (heat soak+hydraulic autofrettage) sequences;
3. An optional final heat soak.

The heat soak causes microscopic dislocations to be reduced or eliminated while retaining macroscopic residual stresses due to the previous overload. Hence the material responds effectively as virgin material containing a pre-existing residual stress field when the next overload is applied. Plastic strains, and hence Bauschinger effect, during subsequent re-overloads are thereby dramatically reduced. This behavior is analogous to autofrettage of pre-shrunk tubes wherein there has been no prior plastic deformation [10]. Residual stresses created by such a sequence are illustrated in FIG. 1, taken from [9].

Figure 1:
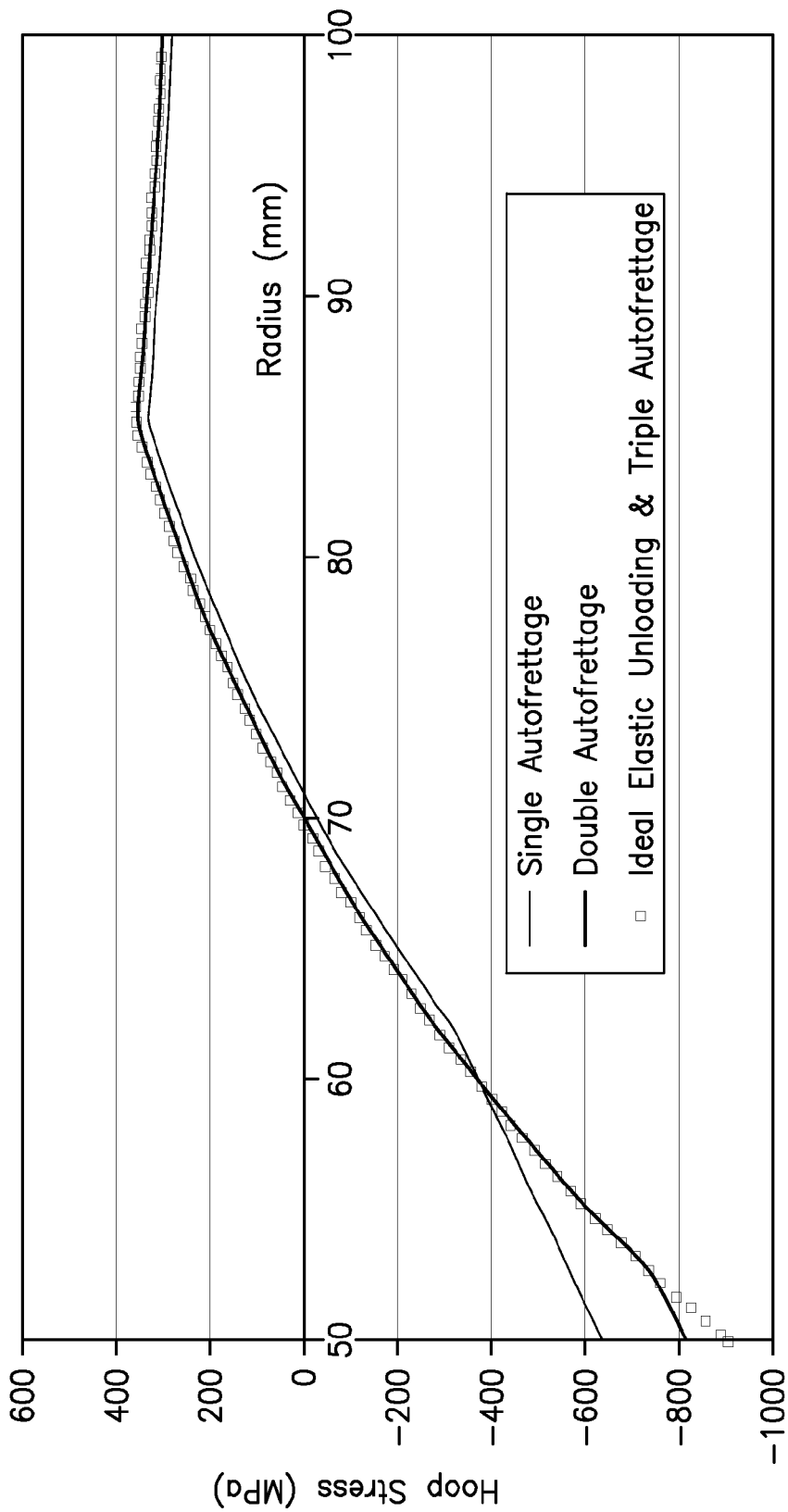
FIG. 1 is a graph of residual hoop stress for three sequences of hydraulic autofrettage.

FIG. 1 shows residual hoop stresses for single autofrettage, double autofrettage, triple autofrettage and for ideal elastic unloading. The stresses in FIG. 1 were obtained using numerical analysis of a typical gun tube or general pressure vessel geometry comprising steel. The radius ratio (external radius/internal radius) is 2, the yield strength (0.1%) is 1069 MPa, and the overstrain is 70%.

The present invention includes the following sequence:
1. Initial swage autofrettage;
2. One or more (heat soak+hydraulic autofrettage) sequences; and
3. An optional final heat soak.

The above procedure is distinctly different from hydraulic autofrettage followed by heat soak and further hydraulic re-autofrettage.

A specific embodiment of the invention will now be described by way of an example with reference to the accompanying FIGS. 2-6 and Table 1. Values of stresses presented within FIGS. 3-6 are based upon a standard numerical stress analysis procedure [4] which permits the incorporation of pre-existing residual stress fields from prior loading sequences [9].

Figure 2:
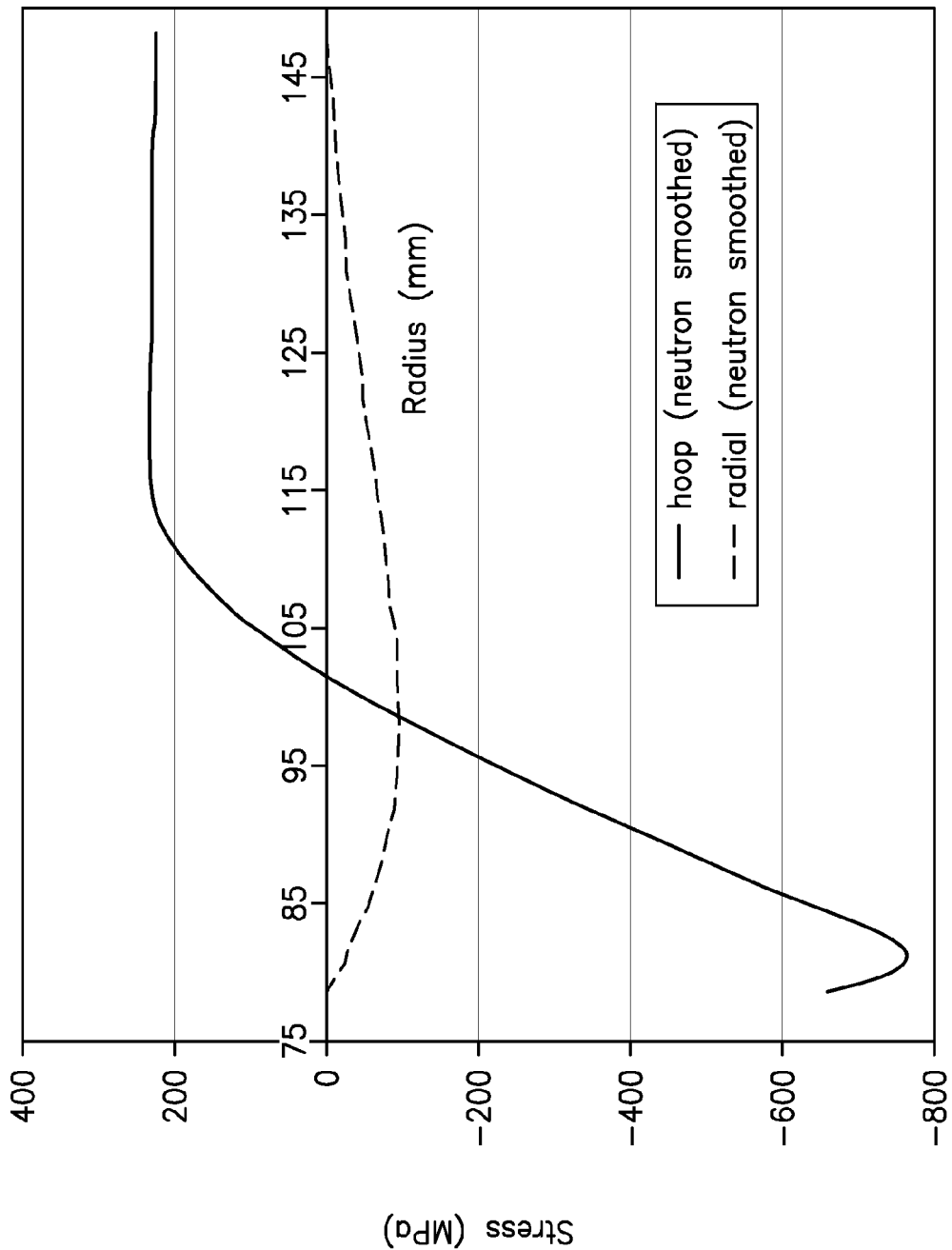
FIG. 2 is a graph of experimentally determined residual hoop and radial stresses in a tube after initial swage autofrettage and removal of some material from the bore and outside diameter.

FIG. 2 shows experimentally determined residual hoop and radial stresses in a short ring taken from a tube after initial swage autofrettage and removal of some material from the bore and outside diameter. The material removal is a standard and essential element in the manufacture of critical section(s) of large caliber gun barrels. The tube was manufactured from a typical (A723 type) pressure vessel steel having 0.1% offset yield strength of 1130 MPa. [9].

Figure 3:
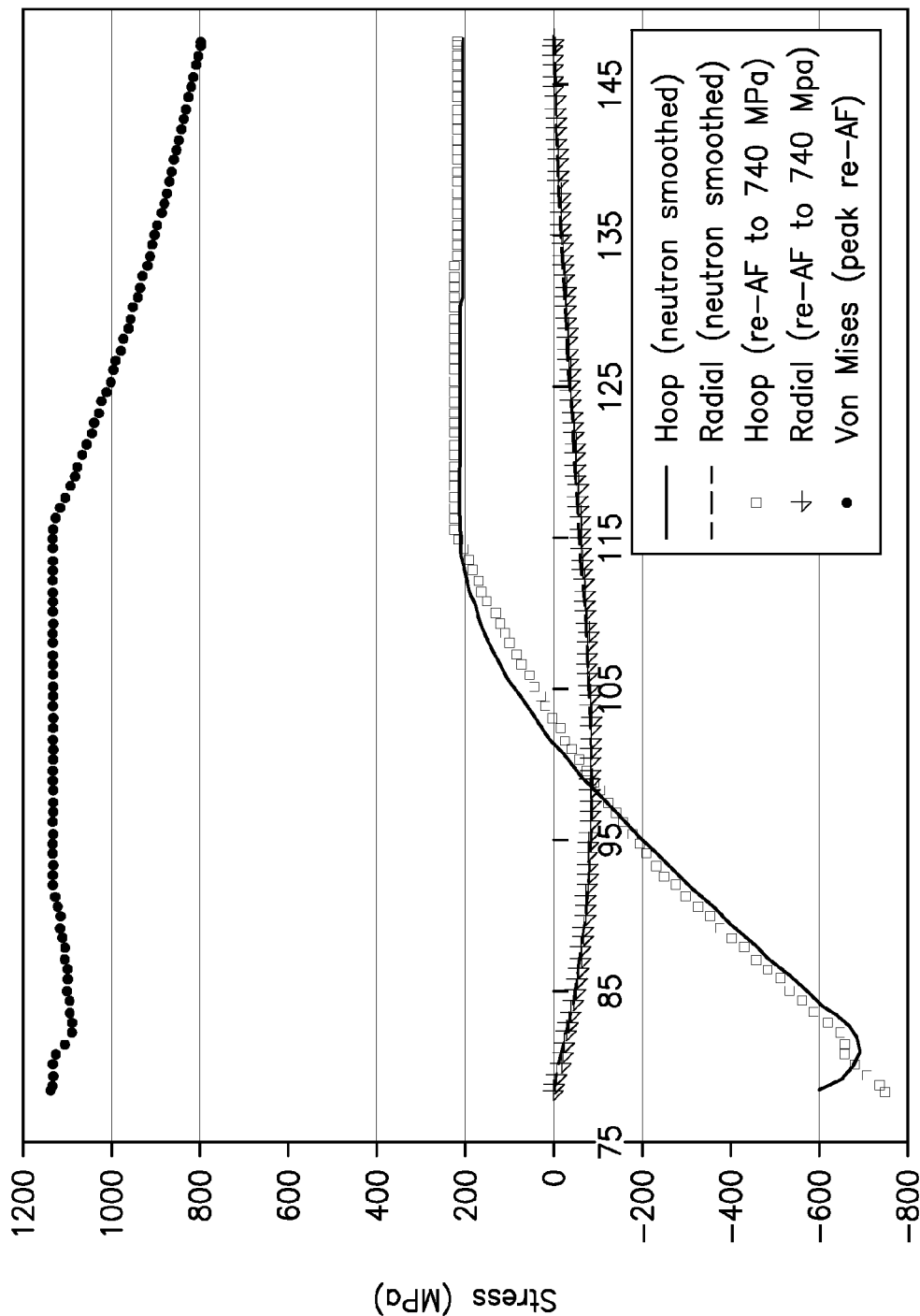
FIG. 3 is a graph of numerically calculated stress after the application of a hydraulic re-autofrettage pressure of 740 MPa.

FIG. 3 shows the numerically calculated stress state after the application of a hydraulic re-autofrettage pressure of 740 MPa. While there is minor re-yielding near the bore, the bulk of the re-yielding is within the wall of the tube adjacent to the original (swage) elastic-plastic interface. The zones of re-yielding may be identified from the Von Mises (peak re-autofrettage) curve as the points at which the Von Mises stress reaches 1130 MPa.

Figure 4:
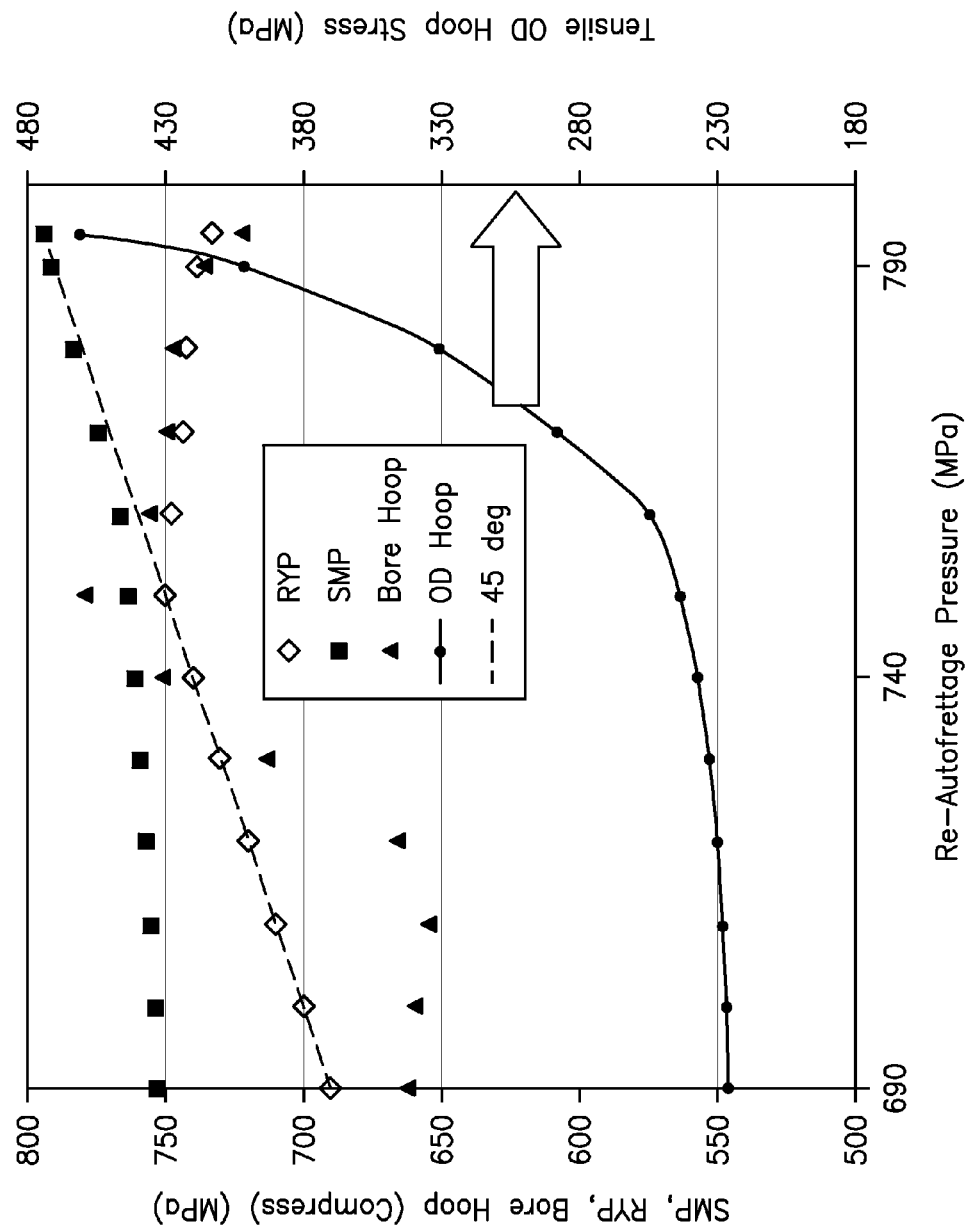
FIG. 4 is a graph of re-yield pressure, safe maximum pressure, residual compressive hoop stress at the bore, and outside diameter hoop stress for different re-autofrettage pressures.

A sequence of equivalent numerical analyses, each at a different re-autofrettage pressure, gives the discrete pressure and stress values shown in FIG. 4. FIG. 4 incorporates a correction for the ring-cutting process. In FIG. 4 'RYP' indicates re-yield pressure, the pressure at which re-yielding commences. 'SMP' indicates safe maximum pressure, defined as the pressure that creates an additional, permanent, 0.01% circumferential strain at the outside diameter following its removal. "Bore Hoop" is the residual compressive hoop stress at the bore. "OD hoop" is the outside diameter hoop stress. The values are tabulated in Table 1.

TABLE 1

| Re-Autofrettage pressure | RYP (MPa) | SMP (Mpa) | Bore Hoop (MPa) | OD hoop (MPa) |
|---|---|---|---|---|
| 690 | 690 | 752.8 | 661.9 | 225.6 |
| 700 | 700 | 753.6 | 659.5 | 226.4 |
| 710 | 710 | 755.0 | 655.0 | 227.7 |
| 720 | 720 | 756.8 | 666.2 | 229.9 |
| 730 | 730 | 758.9 | 713.2 | 232.9 |
| 740 | 740 | 760.9 | 751.0 | 237.2 |
| 750 | 750 | 762.8 | 779.3 | 243.4 |
| 760 | 747.5 | 766.3 | 756.1 | 255.0 |
| 770 | 743.6 | 774.7 | 749.6 | 287.5 |
| 780 | 742.3 | 783.0 | 747.2 | 330.6 |
| 790 | 738.2 | 791.4 | 735.6 | 401.2 |
| 794 | 733 | 793.8 | 721.8 | 460.7 |

FIG. 4 and Table 1 contain several noteworthy features:
1. Initial re-yielding begins at the original elastic-plastic interface at 689.5 MPa but does not occur at bore until 716.7 MPa. Thereafter the yielded 'zones' merge at 761.5 MPa.
2. Over the range 690-750 MPa, RYP equals the re-autofrettage pressure. This is because, on subsequent depressurization, there is no reversed yielding. Hence, on further pressurization, the tube behaves elastically up to its earlier re-autofrettage pressure.
3. Over the range 690-750 MPa, the re-yield pressure is equal to the re-autofrettage pressure. This is a feature not previously achieved, either as a result of single autofrettage, whether hydraulic or swage, or as a result of hydraulic re-autofrettage of a tube that was initially subjected to hydraulic autofrettage.
4. Over the range 690-710 MPa, there is a slight reduction in compressive bore hoop stress (Note: this slight reduction should not be confused with the near-bore upturn in FIG. 2).
5. When the re-yielding commences at the bore at 716 MPa, additional compression is available to counter the above effect. There is then a significant increase in compressive bore hoop stress thru to 750 MPa, which then reduces and reverses at 760 MPa as the two re-yield zones merge.
6. The downturn in both compressive bore hoop stress and RYP above 750 MPa is largely due to the final loss of any benefit associated with the original swage autofrettage. At this point, the tube is behaving as if it had only ever experienced hydraulic autofrettage.
7. The behaviour of bore hoop stress and RYP over the range 690-750 MPa appears significant. 750 MPa is an optimum re-autofrettage pressure at which both bore hoop stress and RYP are maximized.
8. SMP rises monotonically as re-autofrettage pressure is increased. For the current tube, SMP approaches re-autofrettage pressure at 792 MPa. Conversely, the optimum re-autofrettage pressure for maximum RYP is 750 MPa, with no benefit above this level.

Figure 5:
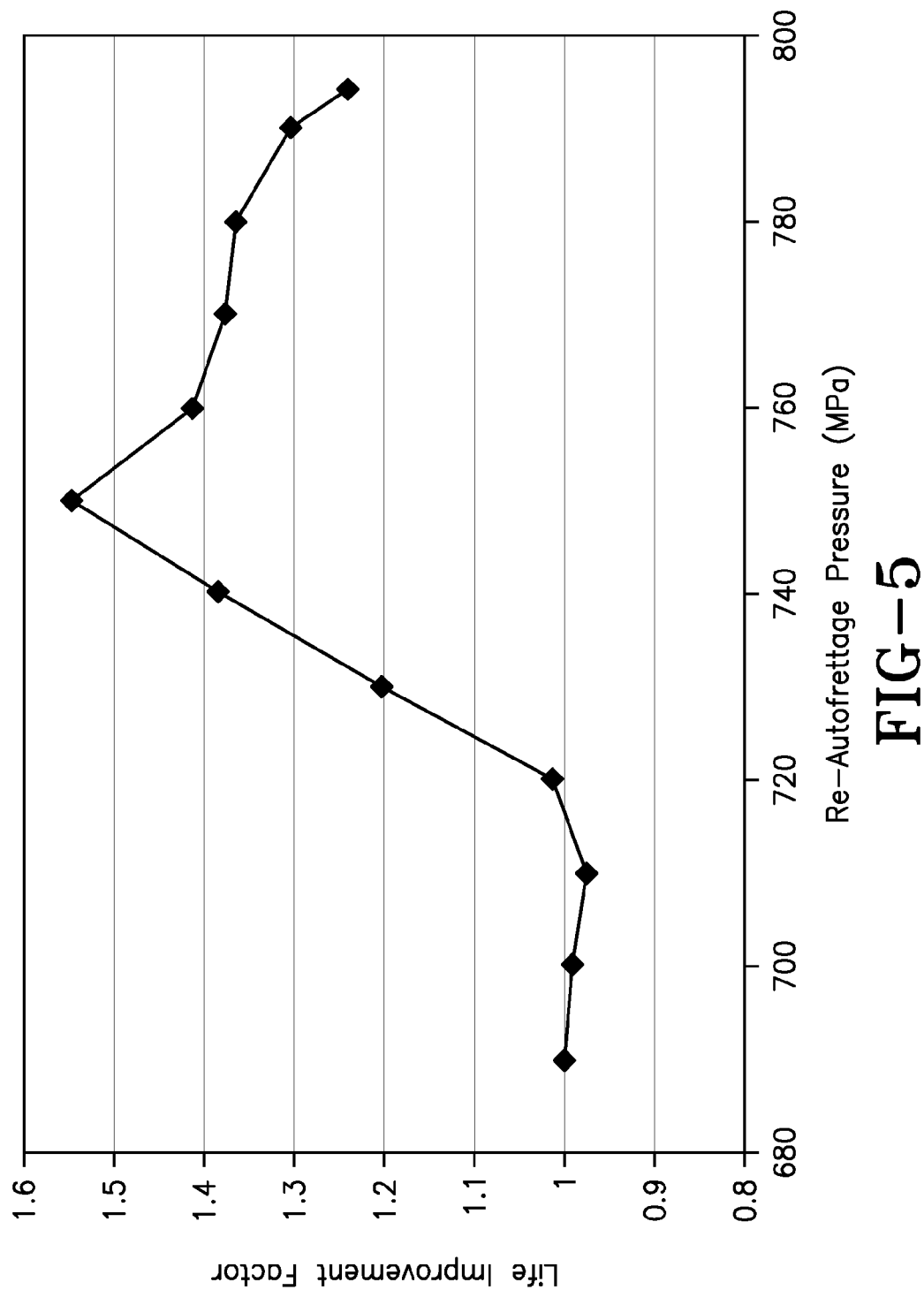
FIG. 5 is a graph of life improvement factor as a function of re-autofrettage pressure.

Calculations based on Paris' fatigue crack growth law [11] using data from Table 1 show that the fatigue lifetime of such a tube, cycled with fixed internal pressure, would be increased as a result of such a procedure. The proportionate increase in fatigue lifetime for a range of re-autofrettage pressures is shown in FIG. 5. The plot shows life improvement ratio (i.e. lifetime after re-autofrettage and associated heat soaks divided by lifetime after single swage autofrettage). Thus, for example, when the operating cyclic pressure is 550 MPa, prior hydraulic re-autofrettage to 750 MPa increases life by a factor of 1.55.

Experimental Validation of Re-Autofrettage Procedure

There are two sets of experimental data that may be compared with the numerical model employed herein. The first is an extensive set of tests conducted by Audino et al [12] that relate to SMP testing of tubes following initial autofrettage. In this set, three separate swage-autofrettaged A723 steel gun tubes were tested. The three tubes had the dimensions analyzed herein and yield strengths of 1022, 1105 and 1177 MPa, respectively. Strain gauges were attached to the OD of each tube and zeroed. The tube was then pressurized and completely depressurized, after which permanent OD strain was noted. The procedure was repeated with increasing maximum pressure until a permanent OD strain of 0.1% was attained.

Figure 6:
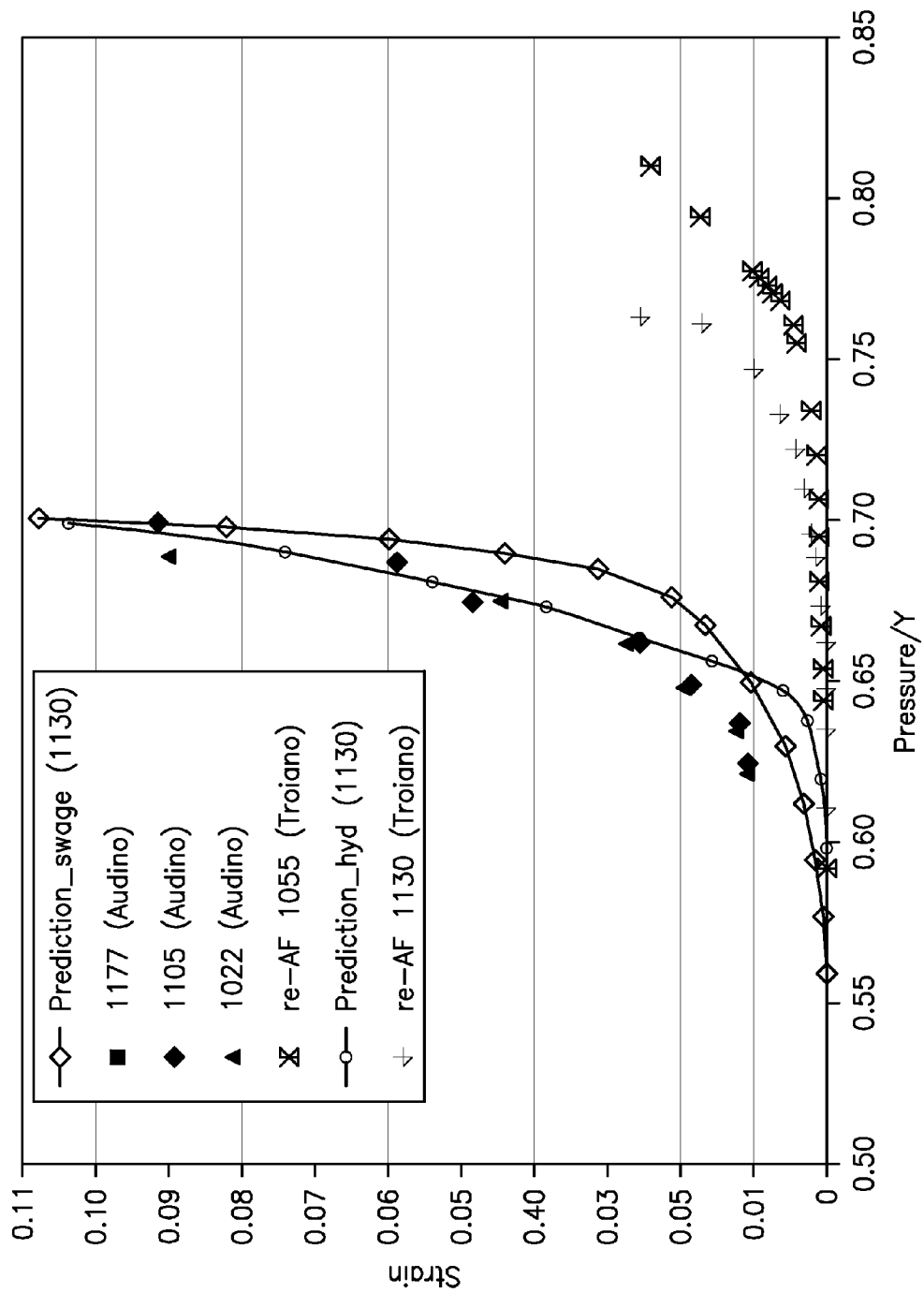
FIG. 6 is a graph of permanent outside diameter strain (percent) as a function of maximum internal pressure normalized with yield strength.

FIG. 6 is a graph of permanent outside diameter strain (percent) as a function of maximum internal pressure, normalized with yield strength. The results of Audino et al. are shown as discrete, filled symbols (squares, diamonds and triangles) on the left side of the graph. The equivalent numerical prediction, incorporating the neutron residual stress measurements, is shown as a heavy curve with open diamond symbols. For comparison, the predicted behaviour following hydraulic autofrettage to the same overstrain is included as a lighter curve with open diamond symbols.

The second set of tests is due to Troiano et al. [13] and relates to SMP testing of tubes following initial swage autofrettage and subsequent low-temperature heat treatment and hydraulic re-autofrettage. Two A723 tubes were tested. The first tube, with yield strength 1055 MPa, was hydraulically re-autofrettaged to a pressure of 710 MPa. The second tube, with yield strength 1130 MPa, was hydraulically re-autofrettaged to a pressure of 731 MPa. Each tube was then subjected to an SMP-type test, as described above, until permanent OD strain reached approximately 0.025%. FIG. 6 shows the experimental results denoted by the two right-hand sets of cross-like symbols.

The pressures achieved during SMP testing of the re-autofrettaged tubes (i.e. the cross-like symbols) actually exceed those predicted via a numerical analysis that assumes little or no retained strain hardening. The explanation of these significantly higher experimental pressures is likely associated with the retention, and increase, of strain hardening throughout the various processes.

Figure 7:
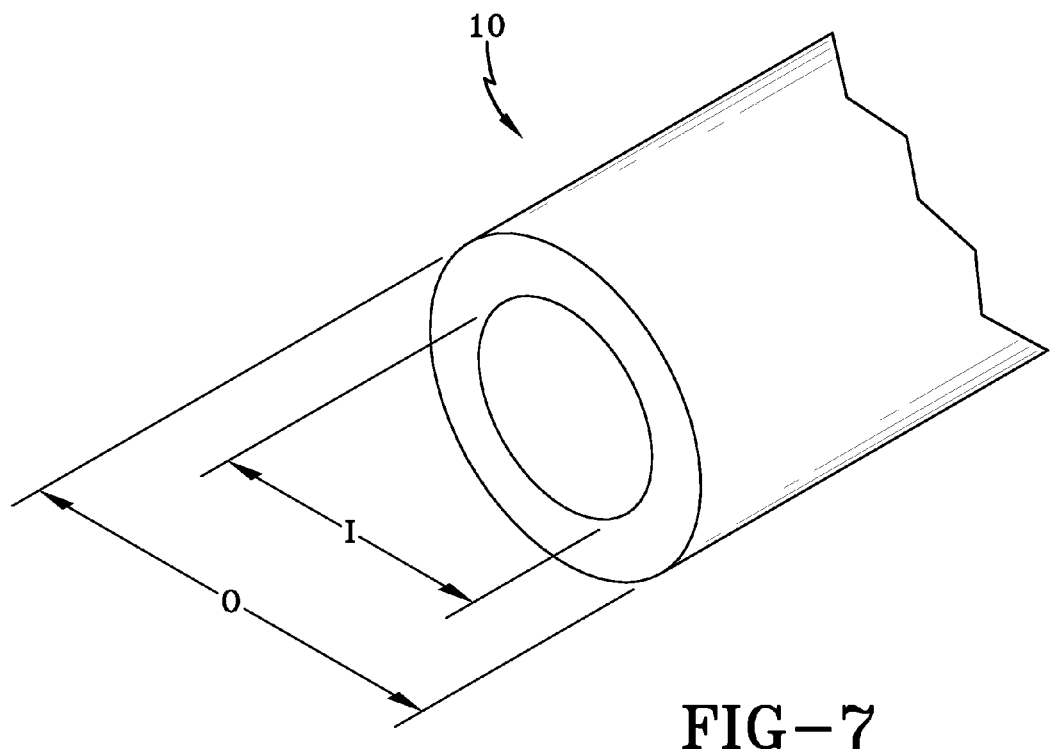
FIG. 7 is a perspective view of a gun barrel.

FIG. 7 is a perspective view of a pressure vessel, for example, a gun barrel 10 with an inner diameter I and an outer diameter O. Gun barrels typically have large radius ratios. After an initial swage autofrettage, material may be removed from the barrel 10. For example, for barrels 10 having outside diameters in a range of about 150 mm to about 350 mm, the inner diameter I may be increased 1-15 mm by removing material and/or the outer diameter may be reduced 1-5 mm by removing material. In some cases, material may also be added. The addition or removal of material may occur after one or more of the combination heat soak and hydraulic autofrettage cycles, rather than after the initial swage autofrettage.

Figure 8:
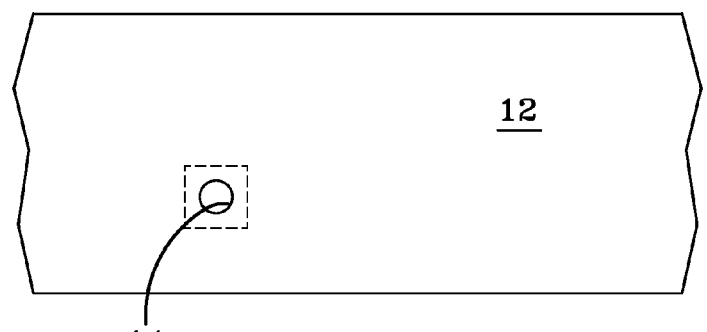
FIG. 8 is a schematic view of a portion of an aircraft fuselage.

FIG. 8 is a schematic view of a portion of an aircraft fuselage 12 having an opening 14 for receiving, for example, a rivet (not shown). The strength of the material surrounding opening 14 may benefit from the inventive method. In this case, because it may not be feasible to subject the entire fuselage 12 to heat treatment, the heat soaking may be localized to the critical area shown by the dashed rectangle.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A method, comprising:
   a first step of performing swage autofrettage on an object;
   a second step of heat soaking the object; and
   a third step of performing hydraulic autofrettage on the object.
2. The method of claim 1, further comprising, repeating the second and third steps.
3. The method of claim 1, further comprising, a fourth step of heat soaking the object.
4. The method of claim 2, further comprising a final step of heat soaking the object.
5. The method of claim 1, wherein the object is a pressure vessel.
6. The method of claim 1, wherein the object is a gun barrel.
7. The method of claim 1, further comprising removing material from the object after the first step.
8. The method of claim 1, further comprising removing material from the object after the third step.
9. The method of claim 1, further comprising adding material to the object after the first step.
10. The method of claim 1, further comprising adding material to the object after the third step.
11. The method of claim 3, further comprising removing material from the object after the fourth step.
12. The method of claim 3, further comprising adding material to the object after the fourth step.
13. The method of claim 1, wherein the second step is restricted to a critical area of the object.
14. The method of claim 2, wherein the second step is restricted to a critical area of the object.
15. The method of claim 3, wherein the fourth step is restricted to a critical area of the object.
16. The method of claim 4, wherein the final step is restricted to a critical area of the object.

* * * * *